(12) United States Patent
Mori et al.

(10) Patent No.: US 12,112,021 B2
(45) Date of Patent: Oct. 8, 2024

(54) DISPLAY CONTROL DEVICE, DISPLAY CONTROL METHOD, AND DISPLAY CONTROL PROGRAM

(71) Applicant: Nippon Telegraph and Telephone Corporation, Tokyo (JP)

(72) Inventors: Tomonori Mori, Musashino (JP); Taisuke Wakasugi, Musashino (JP); Masashi Tadokoro, Musashino (JP); Akira Kataoka, Musashino (JP); Haruo Oishi, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 18/035,374

(22) PCT Filed: Nov. 10, 2020

(86) PCT No.: PCT/JP2020/041980
§ 371 (c)(1),
(2) Date: May 4, 2023

(87) PCT Pub. No.: WO2022/102000
PCT Pub. Date: May 19, 2022

(65) Prior Publication Data
US 2024/0012542 A1   Jan. 11, 2024

(51) Int. Cl.
*G06F 3/0484* (2022.01)

(52) U.S. Cl.
CPC .................................. *G06F 3/0484* (2013.01)

(58) Field of Classification Search
None
See application file for complete search history.

(56) References Cited

U.S. PATENT DOCUMENTS

2021/0200393 A1*  7/2021  Wohlstadter .......... G06F 3/0485
2021/0271355 A1   9/2021  Masuda et al.

FOREIGN PATENT DOCUMENTS

JP       2020004280        1/2020

\* cited by examiner

*Primary Examiner* — Ifedayo B Iluyomade
(74) *Attorney, Agent, or Firm* — Fish & Richardson P.C.

(57) ABSTRACT

An acquisition unit acquires a use frequency of a user of a UI extension component of a GUI component constituting a predetermined application and a use frequency of the user of a cooperation component which is a target GUI component for an operation of the UI extension component. A determination unit determines whether to display the UI extension component to the user based on the use frequency of the UI extension component of the user and a utilization frequency of the UI extension component calculated by using the use frequency of the cooperation component.

7 Claims, 4 Drawing Sheets

DISPLAY CONTROL DEVICE, DISPLAY CONTROL METHOD, AND DISPLAY CONTROL PROGRAM

CROSS-REFERENCE TO RELATED APPLICATIONS

This application is a National Stage application under 35 U.S.C. § 371 of International Application No. PCT/JP2020/041980, having an International Filing Date of Nov. 10, 2020, the disclosure of which is considered part of the disclosure of this application, and is incorporated by reference in its entirety into this application.

TECHNICAL FIELD

The present invention relates to a display control apparatus, a display control method, and a display control program.

BACKGROUND ART

Conventionally, a UI extension technology of displaying an extended user interface (UI) on an operation screen to display information required by a user of an application without modifying an application of an existing system is known. For example, there is known a technology of appropriately updating a UI expansion display according to a change in a work scene by defining a work scene for performing the UI extension display and a display rule for each work scene (refer to Patent Literature 1).

CITATION LIST

Patent Literature

Patent Literature 1: JP 2020-004280 A

SUMMARY OF INVENTION

Technical Problem

However, in the conventional annotation technology, it is difficult to display an annotation suitable for the situation of each user. For example, it is difficult to display an annotation suitable for a situation of each user with uniform display rules for each work scene because situations such as a skill level and a work content of the user are diverse.

The present invention has been made in view of the above, and an object thereof is to perform annotation display suitable for a situation of each user.

Solution to Problem

In order to solve the above-described problems and achieve the object, a display control apparatus according to the present invention includes: an acquisition unit that acquires a use frequency of a user of a UI extension component of a GUI component constituting a predetermined application and a use frequency of the user of a cooperation component that is a target GUI component for an operation of the UI extension component; and a determination unit that determines whether to display the UI extension component to the user based on the use frequency of the UI extension component and a utilization frequency of the UI extension component calculated by using the use frequency of the cooperation component.

Advantageous Effects of Invention

According to the present invention, annotation display suitable for the situation of each user can be performed.

DESCRIPTION OF EMBODIMENTS

Hereinafter, an embodiment of the present invention will be described in detail with reference to the drawings. Note that the present invention is not limited by this embodiment. Further, in the description of the drawings, the same portions are denoted by the same reference signs.

[Configuration of Display Control Apparatus]

Figure 1:
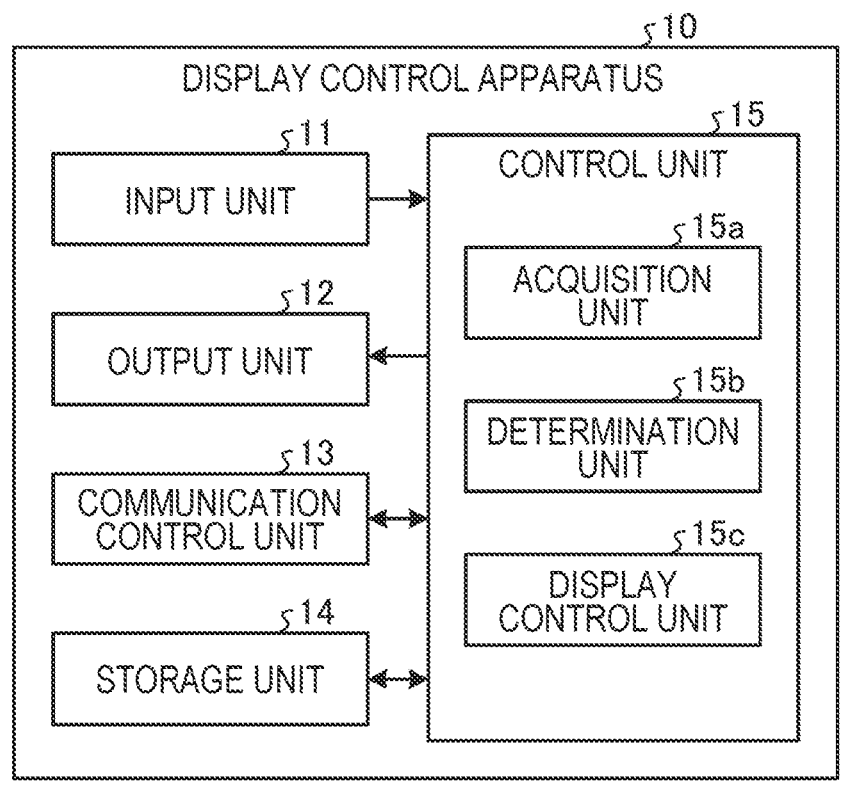
FIG. 1 is a schematic diagram illustrating a schematic configuration of a display control apparatus according to the present embodiment.
Figure 2:
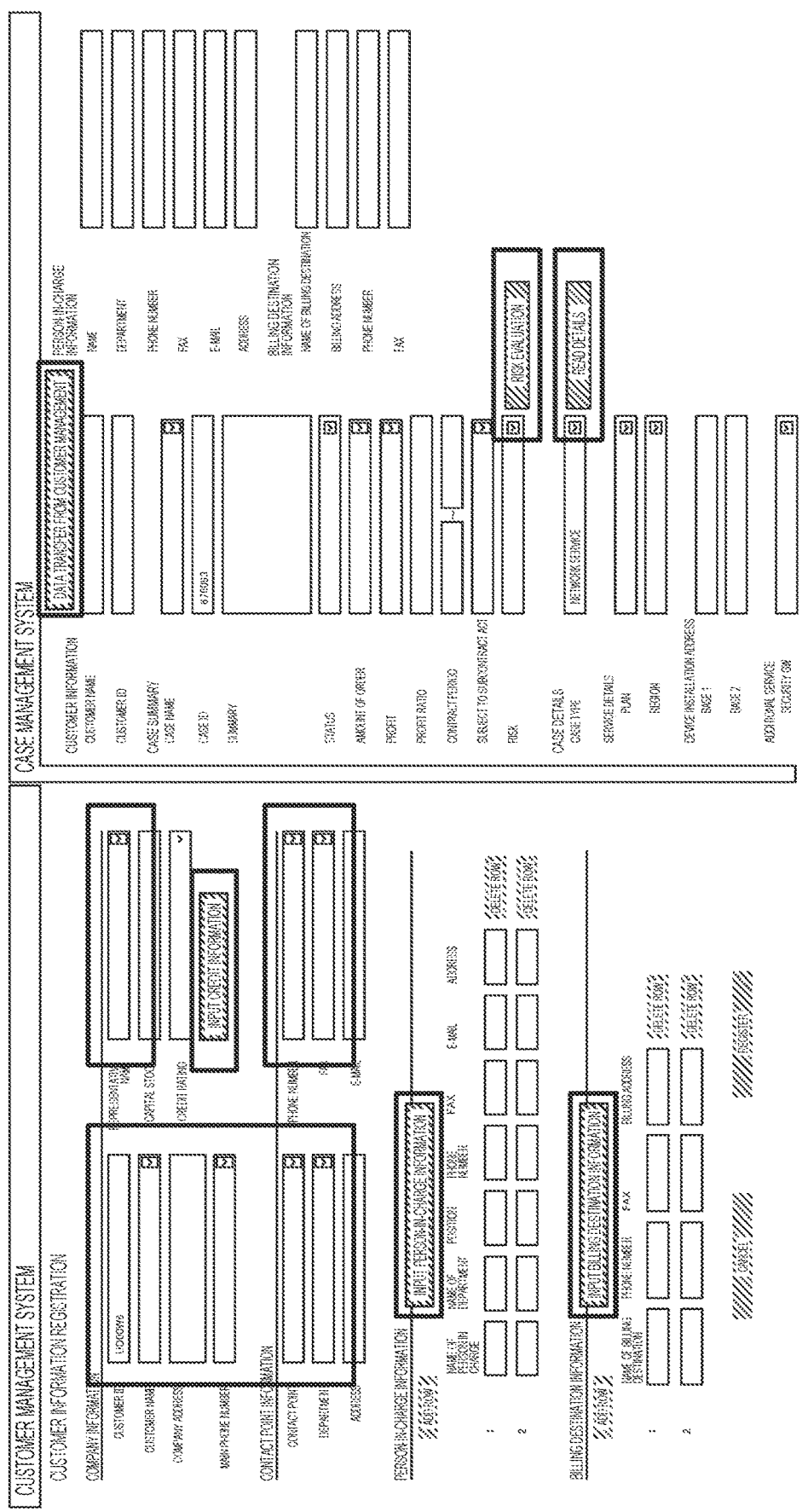
FIG. 2 is a diagram for describing a UI extension component.

FIG. 1 is a schematic diagram illustrating a schematic configuration of a display control apparatus 10. As illustrated in FIG. 2, the display control apparatus 10 of the present embodiment is realized by a general-purpose computer such as a workstation or a personal computer, and includes an input unit 11, an output unit 12, a communication control unit 13, a storage unit 14, and a control unit 15.

The input unit 11 is realized by using an input device such as a keyboard and a mouse, and inputs various kinds of instruction information such as a processing start to the control unit 15 in response to input operations of an operator. The output unit 12 is realized by a display device such as a liquid crystal display, a printing device such as a printer, an information communication device, or the like. The communication control unit 13 controls communication with an external apparatus via a telecommunication line such as a local area network (LAN) or the Internet. For example, the communication control unit 13 controls communication between the control unit 15 and a terminal operated by the user, a management device that manages an operation log of the user, or the like.

The storage unit 14 is realized by a semiconductor memory element such as a random access memory (RAM) or a flash memory or a storage device such as a hard disk or an optical disc. Note that the storage unit 14 may be configured to communicate with the control unit 15 via a telecommunication line such as a LAN or the Internet.

In the present embodiment, the storage unit 14 records, for example, information regarding a UI extension component which is a target of display control processing to be described later. The information regarding the UI extension component is, for example, information regarding how to display the UI extension component as annotation display, information specifying a GUI component corresponding to the UI extension component, operation settings of the UI extension component, information specifying a cooperation component which is a GUI component which is an operation target, and the like.

Here, the cooperation component is a target GUI component for an operation of the UI extension component. That is, the cooperation component is, for example, a GUI component which is an input target in a case where operation setting of performing an input into a predetermined GUI component when there is an input is performed for the UI extension component that receives an input such as a check box or a selection input. Alternatively, the cooperation component is a plurality of GUI components which are input targets in a case where operation setting of collectively performing input into a plurality of predetermined GUI components is performed for the UI extension component. In this manner, operation setting is performed in advance for the UI extension component to control the cooperation component.

FIG. 2 is a diagram for describing the UI extension component. In the example illustrated in FIG. 2, the UI extension component surrounded by a thick frame is displayed to be superimposed on the GUI component on the screen. The user can easily perform an input into the GUI component using the UI extension component such as a check box or a selection input. For example, in the example illustrated in FIG. 2, by pressing "Input person-in-charge information", information in each row of the person-in-charge information is collectively input.

On the other hand, the user can directly input information into the cooperation component without using the UI extension component. For example, in the example illustrated in FIG. 2, the user can directly input information of each row of the person-in-charge information.

The description returns to FIG. 1. The control unit 15 is implemented by a central processing unit (CPU) or the like, executes a processing program stored in a memory, and functions as an acquisition unit 15a, a determination unit 15b, and a display control unit 15c as illustrated in FIG. 1. Note that each or some of these functional units may be implemented in different hardware. For example, the acquisition unit 15a may be implemented in hardware different from the determination unit 15b and the display control unit 15c. Furthermore, the control unit 15 may have other functional units.

The acquisition unit 15a acquires the use frequency of the user of the UI extension component of the GUI component constituting the predetermined application and the use frequency of the user of the cooperation component which is the target GUI component for the operation of the UI extension component. Specifically, the acquisition unit 15a acquires the use frequency of the UI extension component of the GUI component constituting the predetermined application in the past by the user and the use frequency of the cooperation component of the UI extension component from the terminal operated by the user or from the management device managing the operation log of the user.

For example, the acquisition unit 15a acquires the use frequency in a predetermined time using the number of times of input such as pressing to the UI extension component as the number of uses. The use frequency of the UI extension component is, for example, the number of uses of the UI extension component in a predetermined time. Alternatively, the use frequency of the UI extension component may be a proportion of the number of uses of the UI extension component in a case where the number of uses of all the UI extension components is a predetermined number.

In addition, the acquisition unit 15a acquires the use frequency in a predetermined time by using the number of times of direct input into the cooperation component as the number of uses. The use frequency of the cooperation component is, for example, the number of uses of the cooperation component in a predetermined period. Alternatively, the use frequency of the cooperation component may be a ratio of the number of uses of the cooperation component in a case where the number of uses of all the cooperation components is a predetermined number.

For example, with a predetermined period such as the latest 24 hours as a monitoring time T, the acquisition unit 15a acquires the number of uses $N_i$ of each of the i UI extension components used by the user in the monitoring time T and the number of uses $R_{ij}$ of each of the j cooperation components of the UI extension components for each user who operates the application. In addition, the acquisition unit 15a calculates the use frequency of each UI extension component and the use frequency of each cooperation component by using the acquired information.

The acquisition unit 15a may store the acquired number of uses of the UI extension component and the acquired number of uses of the cooperation component, or the calculated use frequency of the UI extension component and the calculated use frequency of the cooperation component in the storage unit 14.

The determination unit 15b determines whether to display the UI extension component to the user based on the use frequency of the UI extension component of the user and the utilization frequency of the UI extension component calculated by using the use frequency of the cooperation component.

Specifically, in a case where the use frequency of the cooperation component by the user is high, the determination unit 15b determines that the corresponding UI extension component is not effectively used, and uses the use frequency of the cooperation component as the negative utilization frequency of the UI extension component. Then, the determination unit 15b determines whether to display the UI extension component for the user by using the use frequency and the utilization frequency of the UI extension component for the user.

For example, the determination unit 15b calculates a display control value $D_i$ by adding the function value of the use frequency of the UI extension component and the function value of the utilization frequency of the UI extension component. Specifically, for each UI extension component, the determination unit 15b calculates the display control value $D_i$ by subtracting the function value of the use frequency of the cooperation component of the UI extension component from the function value of the use frequency of the UI extension component as expressed by the following Formula (1).

[Mathematical formula 1]

$$D_i = f(N_i, T) - g(R_{i,j}, j, T) \quad (1)$$

In the above Formula (1), a function f of the first term is a function of the use frequency of the UI extension component. In addition, a function g of the second term is a function of the cooperation component, and a function obtained by multiplying the function g by – (negative) is a function of the utilization frequency of the UI extension component. That is, the determination unit 15b calculates the display control value $D_i$ by adding the positive function value of the use frequency of the UI extension component and the negative function value of the utilization frequency of the UI extension component.

In a case where the calculated display control value $D_i$ is equal to or greater than a predetermined threshold value K, the determination unit 15b determines to display the UI extension component. In addition, in a case where the display control value $D_i$ is less than the predetermined threshold value K, the determination unit 15b determines not to display the UI extension component. Alternatively, for example, with the threshold value K=0, the determination unit 15b may determine to display the UI extension component in a case where $D_i$ is greater than K, and determine not to display the UI extension component in a case where $D_i$ is equal to or less than K.

The display control unit 15c displays the UI extension component determined to be displayed by the determination unit 15b to the user. For example, the display control unit 15c displays the UI extension component by being superimposed on the GUI component displayed on the screen of the terminal operated by the user via the communication control unit 13.

As described above, the display control apparatus 10 displays the UI extension component only to users who have high use frequency and utilization frequency of the UI extension component in the past. As a result, the display control apparatus 10 can perform annotation display suitable for the situation of each user.

[Display Control Processing]

Figure 3:
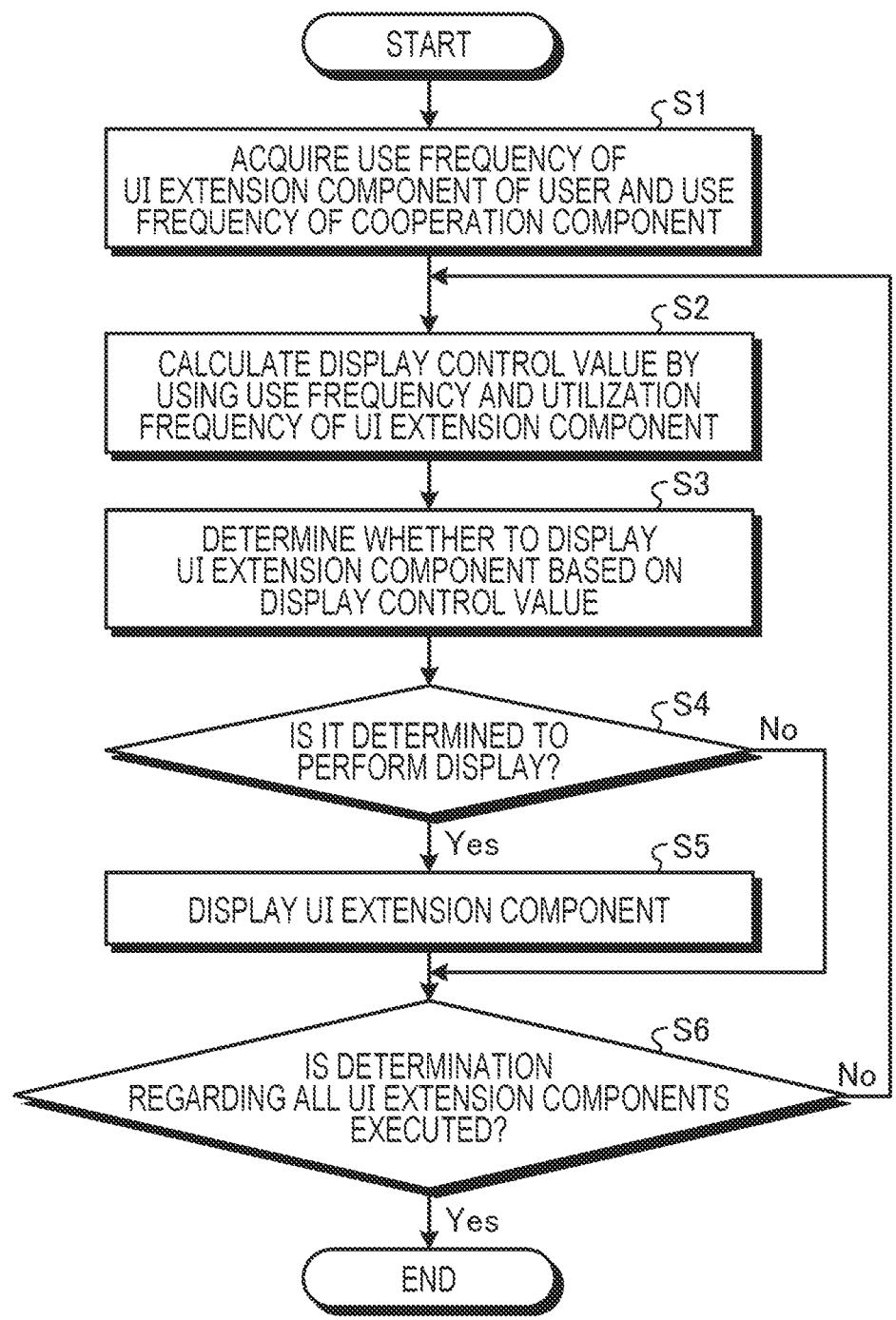
FIG. 3 is a flowchart illustrating a display control processing procedure.

Next, FIG. 3 is a flowchart illustrating a display control processing procedure. The flowchart of FIG. 3 is started, for example, at a timing when an operation for instructing a start of display control processing is input.

First, the acquisition unit 15a acquires the use frequency of the user of the UI extension component of the GUI component constituting the predetermined application and the use frequency of the user of the cooperation component which is the target GUI component for the operation of the UI extension component (step S1). For example, with the latest 24 hours as the monitoring time T, the acquisition unit 15a acquires the number of uses $N_i$ of each of the i UI extension components used by the user in the monitoring time T and the number of uses $R_{ij}$ of each of the j cooperation components of the UI extension components for each user who operates the application. In addition, the acquisition unit 15a calculates the use frequency of each UI extension component and the use frequency of each cooperation component by using the acquired information.

Next, the determination unit 15b calculates the display control value $D_i$ by using the use frequency of the UI extension component of the user and the utilization frequency of the UI extension component calculated by using the use frequency of the cooperation component (step S2).

In addition, the determination unit 15b determines whether to display the UI extension component for the user based on the calculated display control value $D_i$ (step S3). For example, in a case where the calculated display control value $D_i$ is equal to or greater than the predetermined threshold value K, the determination unit 15b determines to display the UI extension component. In addition, in a case where the display control value $D_i$ is less than the predetermined threshold value K, the determination unit 15b determines not to display the UI extension component.

In a case where the determination unit 15b determines to perform display (step S4, Yes), the display control unit 15c displays the UI extension component on the screen of the terminal operated by the user (step S5). On the other hand, in a case where the determination unit 15b determines not to perform display (step S4, No), the processing proceeds to step S6.

Then, in a case where it is not determined whether to display all the UI extension components (step S6, No), the determination unit 15b returns the processing to step S2 and determines whether to similarly display the other UI extension components.

On the other hand, in a case where it is determined whether to display all the UI extension components (step S6, Yes), the determination unit 15b ends the series of display control processing.

As described above, in the display control apparatus 10 of the present embodiment, the acquisition unit 15a acquires the use frequency of the user of the UI extension component of the GUI component constituting the predetermined application and the use frequency of the user of the cooperation component which is the target GUI component for the operation of the UI extension component. In addition, the determination unit 15b determines whether to display the UI extension component to the user based on the use frequency of the UI extension component of the user and the utilization frequency of the UI extension component calculated by using the use frequency of the cooperation component.

In this manner, the display control apparatus 10 determines whether to display the UI extension component for each user by using the appearance frequency and the utilization frequency of the UI extension component in the past by each user. As a result, the display control apparatus can perform annotation display suitable for the situation of each user.

In addition, the determination unit 15b determines to display the UI extension component in a case where the value obtained by adding the positive function value of the use frequency of the UI extension component and the negative function value of the utilization frequency of the UI extension component is equal to or greater than a predetermined threshold value. That is, the determination unit 15b determines to display the UI extension component in a case where a value obtained by subtracting the function value of the use frequency of the cooperation component from the function value of the use frequency of the UI extension component is equal to or greater than a predetermined threshold value. As described above, in a case where the use frequency of the cooperation component is high, the display control apparatus 10 can determine that the utilization frequency of the corresponding UI extension component is low and determine not to display the UI extension component.

[Program]

It is also possible to produce a program that describes, in a computer executable language, the processing executed by the display control apparatus 10 according to the above embodiment. In an embodiment, the display control apparatus 10 can be implemented by installing a display control program for executing the above display control processing as packaged software or online software in a desired computer. For example, by causing the information processing apparatus to execute the display control program, the information processing apparatus can be caused to function as the display control apparatus 10. The information processing apparatus mentioned here includes a desktop or notebook personal computer. Further, in addition to the computer, the information processing apparatus includes mobile communication terminals such as a smartphone, a mobile phone, and a personal handyphone system (PHS), and further includes a slate terminal such as a personal digital assistant (PDA).

Further, the display control apparatus 10 can also be implemented as a server device with a terminal device used by a user as a client which provides the client with a service related to the display control processing mentioned above.

For example, the display control apparatus 10 is implemented as a server device that provides a display control processing service for inputting a web page and outputting display of additional information. In this case, the display control apparatus 10 may be implemented as a Web server, or may be implemented as a cloud that provides a service related to the display control processing by outsourcing. Hereinafter, an example of a computer that executes a display control program that realizes a function similar to that of the display control apparatus 10 will be described.

Figure 4:
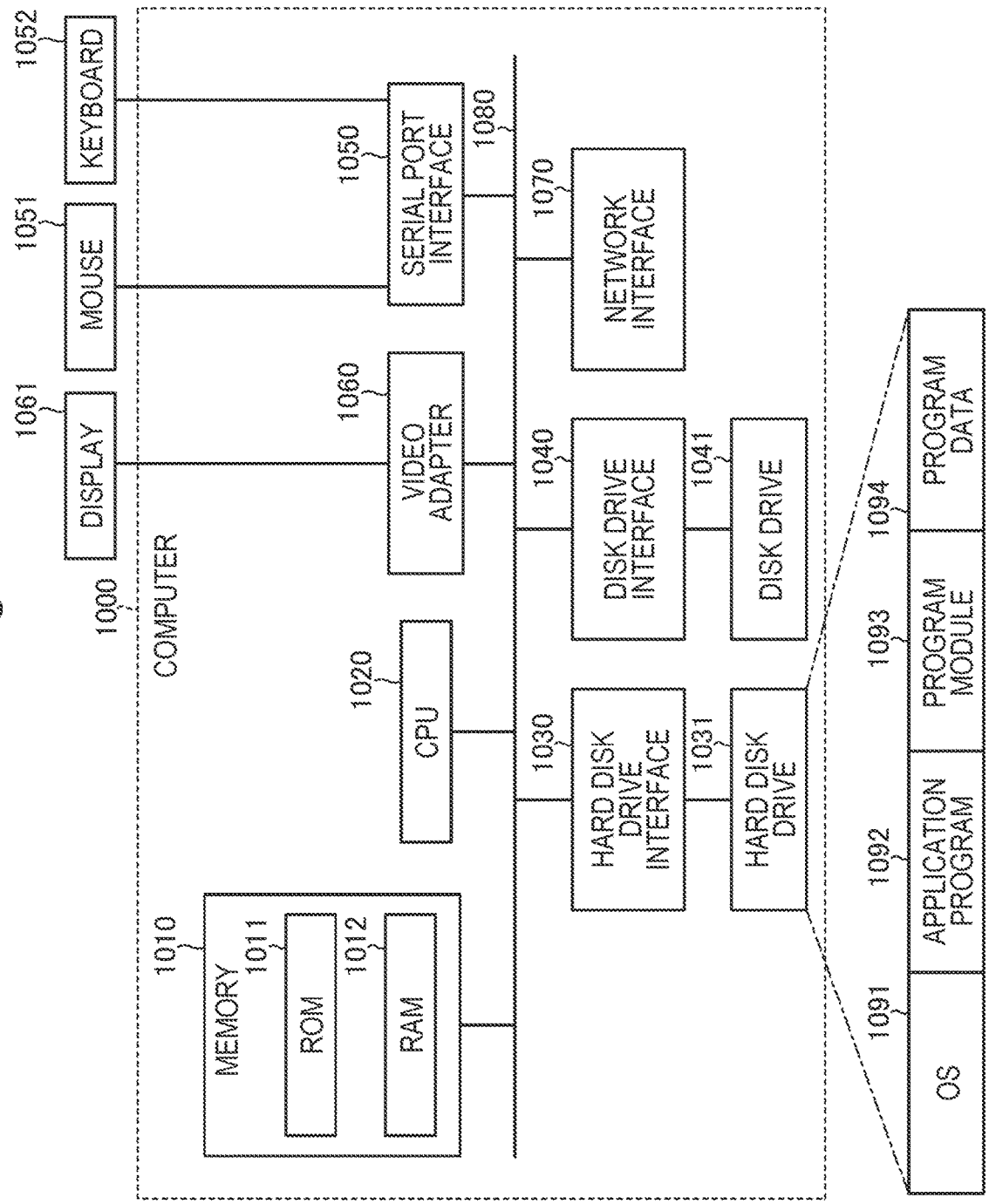
FIG. 4 is a diagram illustrating a computer that executes a display control program.

FIG. 4 is a diagram illustrating an example of a computer that executes the display control program. A computer 1000 includes, for example, a memory 1010, a CPU 1020, a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. For example, a removable storage medium such as a magnetic disk or an optical disc is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. All of the information described in the above embodiment is stored in the hard disk drive 1031 or the memory 1010, for example.

In addition, the display control program is stored in the hard disk drive 1031 as a program module 1093 in which commands to be executed by the computer 1000, for example, are described. Specifically, the program module 1093 in which all of the processing executed by the display control apparatus 10 described in the above embodiment is described is stored in the hard disk drive 1031.

Further, data used for information processing performed by the display control program is stored as program data 1094 in the hard disk drive 1031, for example. Then, the CPU 1020 reads, in the RAM 1012, the program module 1093 and the program data 1094 stored in the hard disk drive 1031 as needed and executes each procedure described above.

Note that the program module 1093 and the program data 1094 related to the display control program are not limited to being stored in the hard disk drive 1031, and may be stored in, for example, a removable storage medium and read by the CPU 1020 via a disk drive 1041 or the like. Alternatively, the program module 1093 and the program data 1094 related to the display control program may be stored in another computer connected via a network such as a local area network (LAN) or a wide area network (WAN) and may be read by the CPU 1020 via the network interface 1070.

Although the embodiments to which the invention made by the present inventor is applied have been described above, the present invention is not limited by the description and drawings constituting a part of the disclosure of the present invention according to the present embodiments. In other words, other embodiments, examples, operation techniques, and the like made by those skilled in the art and the like on the basis of the present embodiments are all included in the scope of the present invention.

REFERENCE SIGNS LIST

10 Display control apparatus
11 Input unit
12 Output unit
13 Communication control unit
14 Storage unit
15 Control unit
15a Acquisition unit
15b Determination unit
15c Display control unit

The invention claimed is:

1. A display control apparatus comprising:
at least one processor; and
a memory device storing instructions that, when executed by the at least one processor, configure the processor to:
acquire a use frequency of a user using a user interface (UI) extension component of a graphical user interface (GUI) component constituting a predetermined application and a use frequency of the user using a cooperation component that is a target GUI component for an operation of the UI extension component; and
determine to display the UI extension component in a case where a value obtained by adding a positive function value of the use frequency of the UI extension component and a negative function value of a utilization frequency of the UI extension component is equal to or greater than a predetermined threshold value, wherein the utilization frequency of the UI extension component is calculated based on the use frequency of the cooperation component.

2. The display control apparatus according to claim 1, wherein
the use frequency of the UI extension component is the number of uses of the UI extension component in a predetermined period.

3. The display control apparatus according to claim 1, wherein
the use frequency of the UI extension component is a ratio of the number of uses of the UI extension component in a case where the number of uses of all the UI extension components is a predetermined number.

4. The display control apparatus according to claim 1, wherein
the use frequency of the cooperation component is the number of uses of the cooperation component in a predetermined period.

5. The display control apparatus according to claim 1, wherein
the use frequency of the cooperation component is a ratio of the number of uses of the cooperation component in a case where the number of uses of all the cooperation components is a predetermined number.

6. A display control method executed by a display control apparatus, the method comprising:
acquiring a use frequency of a user using a user interface (UI) extension component of a graphical user interface (GUI) component constituting a predetermined application and a use frequency of the user using a cooperation component that is a target GUI component for an operation of the UI extension component; and
determining to display the UI extension component in a case where a value obtained by adding a positive function value of the use frequency of the UI extension component and a negative function value of a utilization frequency of the UI extension component is equal to or greater than a predetermined threshold value, wherein the utilization frequency of the UI extension component is calculated based on the use frequency of the cooperation component.

7. A non-transitory computer readable medium storing a program, wherein executing of the program causes a computer to perform operations comprising:

acquiring a use frequency of a user using a user interface (UI) extension component of a graphical user interface (GUI) component constituting a predetermined application and a use frequency of the user using a cooperation component that is a target GUI component for an operation of the UI extension component, and determining to display the UI extension component in a case where a value obtained by adding a positive function value of the use frequency of the UI extension component and a negative function value of a utilization frequency of the UI extension component is equal to or greater than a predetermined threshold value, wherein the utilization frequency of the UI extension component is calculated based on the use frequency of the cooperation component.

* * * * *